(No Model.)

J. C. BARRETT.
HOSE CLAMP.

No. 520,386. Patented May 22, 1894.

WITNESSES
T. J. Johnston
J. W. Wilson

INVENTOR
John C. Barrett
By A. C. Johnston
his atty

THE NATIONAL LITHOGRAPHING COMPANY,
WASHINGTON, D. C.

UNITED STATES PATENT OFFICE.

JOHN C. BARRETT, OF OAKDALE, PENNSYLVANIA.

HOSE-CLAMP.

SPECIFICATION forming part of Letters Patent No. 520,386, dated May 22, 1894.

Application filed May 6, 1893. Serial No. 473,297. (No model.)

*To all whom it may concern:*

Be it known that I, JOHN C. BARRETT, of Oakdale, in the county of Allegheny and State of Pennsylvania, have invented a new and useful Improvement in Hose-Clamps; and I do hereby declare the following to be a full, clear, and exact description thereof.

My invention relates to an improved means for coupling together the ends of flexible hose. It is well known that such hose sometimes burst along the sections, and various means have been contrived to close such openings or bursts.

The object of my invention is to provide a means whereby such sections of hose may be readily and most completely united end to end expeditiously. The invention I have made consists of a coupling whereby the objects of my invention can be readily accomplished all of which will be readily understood from the following description taken in connection with the accompanying drawings wherein—

Figure 1:
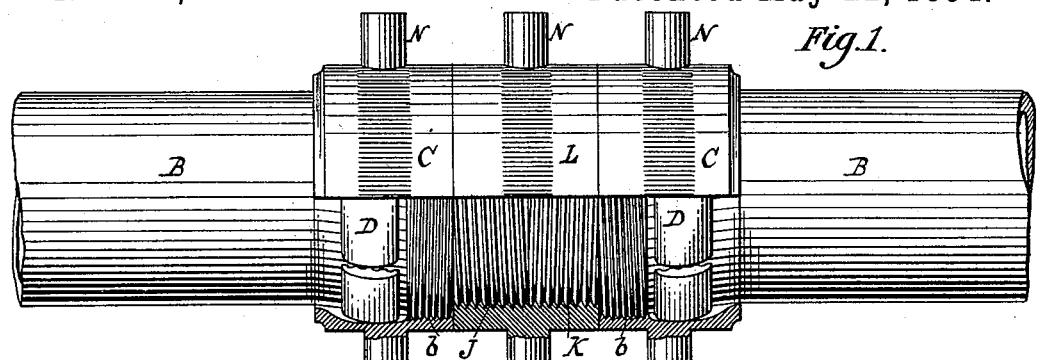
Figure 2:
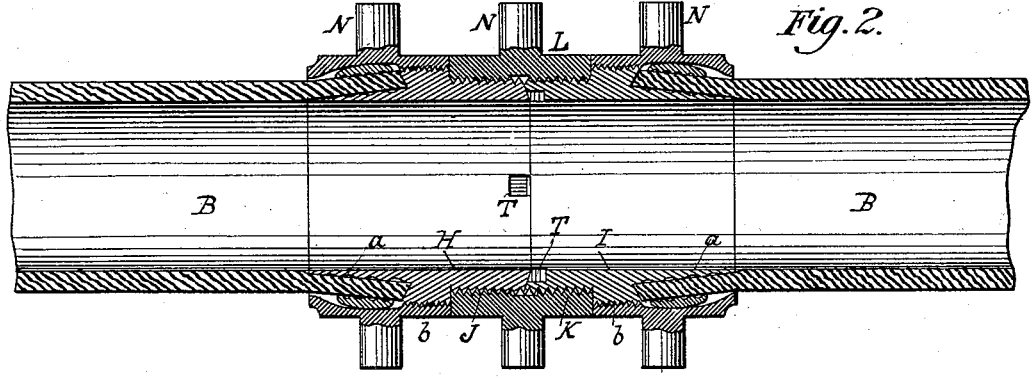
Figure 3:
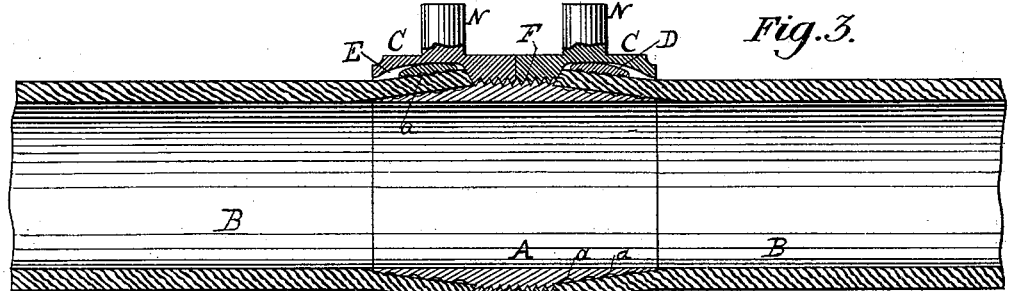
Figure 5:
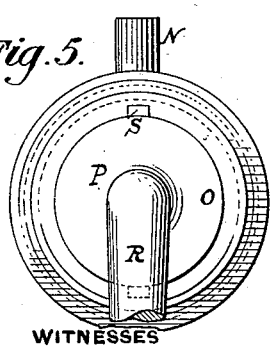
Figure 4:
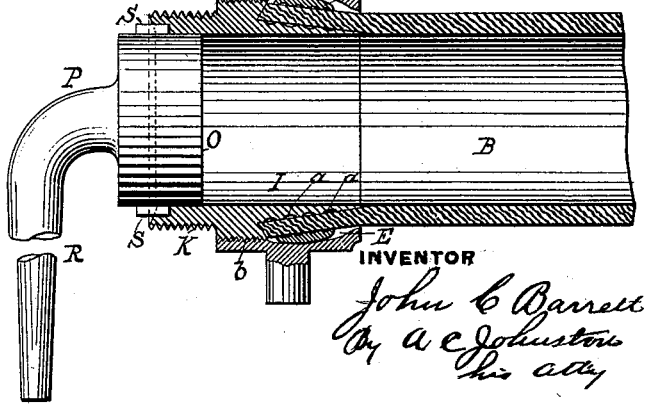

Figure 1. represents partly in side elevation and partly in section two sections of hose joined end to end and connected together by my improved coupling. Fig. 2 is a longitudinal vertical section of the same. Fig. 3 is a longitudinal vertical section of the simplest form of constructing my improved hose coupling. Fig. 4 is one section of hose fitted with a portion of my coupling device showing a wrench for holding the coupling device during the operation of screwing or unscrewing the parts. Fig. 5 is an end view showing the wrench in position within the coupling.

To construct my improved coupling I make an annular short tube A tapered outside from near its middle to each end thereof. Outside and around each tapered portion are formed a number of circumferential shallow grooves *a a*. On that portion between the tapering parts is cut a right and left hand screw *b* so when the ends of the hose sections B are to be united together a ring C is placed over and around the outside of the ends of such hose and between each ring and the hose is an open compressible ring D of any suitable material which lies in a broad recess E formed internally around said ring or rings and this recess is inclined inwardly toward the hose. The rings C are each provided with a screw F that engages with that of the central or inner tube so that when the ends of the hose are inserted each within its respective ring and pushed or forced over the inner tapering portion of the tube A upon screwing said rings together the ends of the hose will be drawn toward each other and up the incline or taper portion of the inner tube, the interior circumferential grooves *a* in each ring will by reason of its inward taper draw the compressible rings D inward and force it downward on the hose with sufficient pressure to make an absolutely tight joint. By this procedure each adjacent end of the hose will be slightly flared or spread outwardly from its normal condition and by natural tendency as well as the applied outside pressure cause such parts of the hose as are within the rings to sink into and engage with the grooves cut around each tapering portion of the inner ring and thereby prevent the hose from being drawn apart.

In some cases I form the inner tube of two similar parts H. I and in addition to the right and left hand screw threads *b* used for screwing on the exterior clamping rings I form two other right and left hand screw threads J. K at a lower point near the juncture of said inner tubes, and these right and left hand screw threads are made to engage with an exterior circumferential ring L which is also provided with right and left hand screw threads as shown in Fig. 1. whereby the inner tapering rings may be tightly drawn together and for this purpose each exterior ring is provided with lugs N whereby the rings may be turned and screwed into place by the use of a spanner.

In putting sections of hose together I first slip over the ends of said hose one of the rings C including the inner compressible ring D and then insert within the end of said hose the thin edge and tapering portion of the inner tube I which by means of a wrench P provided with a circular head O adapted to fit within said tube, this wrench has a handle R and projections or dogs S on opposite sides of that portion adapted to fit within the inner tube and these projections or dogs catch into and engage with corresponding recesses T cut in said tube whereby the same may be easily rotated and screwed into or out of the outer circumferential ring; the end of each hose being so provided the wrench is removed and the inner tubes are screwed into a central circumferential ring L so as to bring the parts close together.

Having thus described my improvement, what I claim is—

In a hose clamp or coupling, the coupling members C, having a right and left hand thread upon their inner ends and a broad recess tapering from said screw threads to their outer ends, and the coupling member L, also having a right and left thread, but of larger caliber, and located between the said members C, in combination with the inside tube provided with screw threads to mesh with the threads of the said coupling members and having ends tapering from its screw thread in a direction parallel to the taper of the recesses and provided with a series of circumferential shallow grooves upon the outside, and the rings D, having a series of similar grooves upon the inside and located in the said recesses so as to clamp the end of a hose or pipe between the two sets of grooves, as set forth.

In testimony whereof I have hereunto set my hand this 29th day of October, A. D. 1892.

J. C. BARRETT.

Witnesses:
A. C. JOHNSTON,
C. S. JOHNSTON.